United States Patent [19]

Carlsen et al.

[11] Patent Number: 5,608,782

[45] Date of Patent: Mar. 4, 1997

[54] TELEPHONE CALL CONNECTION METHOD WITH AUTOMATED PAGING AND CALL BRIDGING

[75] Inventors: Ralph Carlsen; Marc P. Kaplan; John S. Robertson, all of Monmouth County, N.J.

[73] Assignee: AT&T, Holmdel, N.J.

[21] Appl. No.: 442,943

[22] Filed: May 17, 1995

Related U.S. Application Data

[62] Division of Ser. No. 843,685, Feb. 28, 1992.

[51] Int. Cl.⁶ .................................................. H04Q 7/20
[52] U.S. Cl. ............................... 379/63; 379/58; 379/88
[58] Field of Search .................................. 379/59, 63, 88, 379/58, 57, 56

[56] References Cited

U.S. PATENT DOCUMENTS

| | | | |
|---|---|---|---|
| 4,639,914 | 1/1987 | Winters | 370/110.1 |
| 4,661,972 | 4/1987 | Kai | 379/57 |
| 4,905,273 | 2/1990 | Gordon et al. | 279/93 |
| 4,922,526 | 5/1990 | Morganstein et al. | 379/157 |
| 4,942,599 | 7/1990 | Gordon et al. | 379/93 |
| 4,969,184 | 11/1990 | Gordon et al. | 379/100 |
| 5,036,533 | 7/1991 | Carter et al. | 379/59 |
| 5,117,449 | 5/1992 | Metroka et al. | 379/58 |
| 5,127,042 | 6/1992 | Gillig et al. | 379/59 |
| 5,140,626 | 8/1992 | Ory et al. | 379/57 |
| 5,144,648 | 9/1992 | Bhagat et al. | 379/57 |
| 5,157,660 | 10/1992 | Kuwahara et al. | 370/95.1 |
| 5,166,973 | 11/1992 | Hoff et al. | 379/57 |
| 5,202,912 | 4/1993 | Breeden et al. | 379/57 |
| 5,228,073 | 7/1993 | Smith | 379/57 |
| 5,287,403 | 2/1994 | Atkins et al. | 379/144 |
| 5,295,179 | 3/1994 | Asahara et al. | 379/58 |
| 5,311,570 | 5/1994 | Grimes et al. | 379/57 |
| 5,311,594 | 5/1994 | Penzias | 380/23 |
| 5,335,266 | 8/1994 | Richardson, Jr. et al. | 379/88 |
| 5,355,403 | 10/1994 | Richardson et al. | 379/88 |
| 5,371,781 | 12/1994 | Ardon | 379/59 |

FOREIGN PATENT DOCUMENTS

| | | | |
|---|---|---|---|
| 0212761 | 3/1987 | European Pat. Off. | H04Q 7/04 |
| 2660-511 | 10/1991 | France | H04Q 9/02 |
| WO92/03878 | 3/1992 | WIPO | H04B 1/00 |

OTHER PUBLICATIONS

IEEE Standard Dictionary of Electrical and Electronics Terms, 1984, p. 117.

Telephony's Dictionary, 2nd Edition, 1986, pp. 41 and 310.

*Primary Examiner*—William Cumming
*Attorney, Agent, or Firm*—S. M. Gurey

[57] ABSTRACT

An improvement in the transparency of personal telecommunications over the prior art is achieved by automatically placing a return call from a personal communications unit of a called individual in response to a call from a caller and alerting the called individual to the existence of the call placed to his personal number only upon an indication that the call from the calling telephone remains in progress. In one embodiment of the invention, the called individual associates his personal communications unit with a telephone channel, before his reception of any calls. Should a caller make a call to the called individual's personal calling number, the telephone network causes the transmission of an actuation signal. In response to the actuation signal, the personal communications unit places a call to a predetermined number over a switched telephone network using the aforementioned associated telephone channel. As long as the telephone network determines that the caller's telephone call continues to be in progress, it sends an "in progress" signal over the telephone channel to the personal communications unit. During continued reception of the in-progress signal, the personal communications unit causes the generation of an alerting indication. A going off-hook on the telephone channel by a telephone during alerting results in completion of the caller's telephone call to the seizing telephone. To this end, the telephone network stops sending the in progress signal and bridges the caller's call to the return call placed by the personal communications unit.

8 Claims, 7 Drawing Sheets

5,608,782

TELEPHONE CALL CONNECTION METHOD WITH AUTOMATED PAGING AND CALL BRIDGING

This is a division of application Ser. No. 07/843,685 filed Feb. 28, 1992, pending.

TECHNICAL FIELD

This invention relates to personal communications and, more particularly, to systems for setting up communications between a caller and a called individual using a combination of paging and call bridging.

BACKGROUND OF THE INVENTION

A problem with setting up telecommunications connections today is the difficulty of locating called individuals who are highly mobile. This problem is partially alleviated by mobile telephone technology and radio paging systems. However, a caller typically must place several calls to reach a particular individual, one call to each particular type of communication system of which that individual is a subscriber.

A particular prior art approach to reducing the number of calls necessary to reach an individual have combined: a) telephone numbers assigned to individuals rather than locations (personal telephone numbers), b) incoming call management techniques, c) radio paging technology and d) mobile telephone technology. More particularly, the prior art system 1) receives a call from a caller to the personal number of a called individual, 2) places the received call on hold, 3) pages the called individual, and 4) connects the caller to the called individual if the latter places a return call to a predetermined number. See the commonly-assigned copending U.S. patent application, Ser. No. 07/667,734, filed Mar. 11, 1991. A call established by this type of system is not transparent to the called individual, i.e., the called individual perceives the reception of such a call differently from the reception of an ordinary telephone call. This is because the called individual must locate a telephone upon receipt of the page and, thereafter, take the action of making the return call. Moreover, the caller may have ended the call, i.e., decided to "hang up", by the time the called individual completes the return call. In this case, the called individual may become confused as he determines that he has made the return call in vain.

SUMMARY OF THE INVENTION

An improvement in the transparency of personal telecommunications over the prior art is achieved, in accordance with the principles of the invention, by automatically placing a return call from a personal communications unit of a called individual in response to a call from a caller and alerting the called individual to the existence of the call placed to his personal number only upon an indication that the call from the calling telephone remains in progress. This overcomes the potential drawbacks of the prior art system because it assures the called individual that he will be connected to a call that continues to exist when the personal communications unit alerts.

In one embodiment of the invention, the called individual associates his personal communications unit with a telephone channel, before his reception of any calls. Should a caller make a call to the called individual's personal calling number, the telephone network causes the transmission of an actuation signal to the personal communications unit. In response to the actuation signal, the personal communications unit places a return call over a switched telephone network to a predetermined number using the aforementioned telephone channel. As long as the telephone network determines that the caller's telephone call continues to be in progress, it sends a so-called "in progress" signal over the telephone channel to the personal communications unit. After the initial receipt of the in-progress signal, and during its continued reception, the personal communications unit causes the generation of an alerting indication that a person can perceive. A going off-hook on the telephone channel by a telephone during the generation of the alerting indication results in completion of the caller's telephone call to the off-hook telephone. To this end, the telephone network stops sending the in progress signal and bridges the caller's call to the return call placed by the personal communications unit. Advantageously, unless the called individual receives a call, the telephone channel remains free for the placing and receiving of telephone calls, as if it remained unassociated with the personal communications unit.

DETAILED DESCRIPTION

Figure 1:
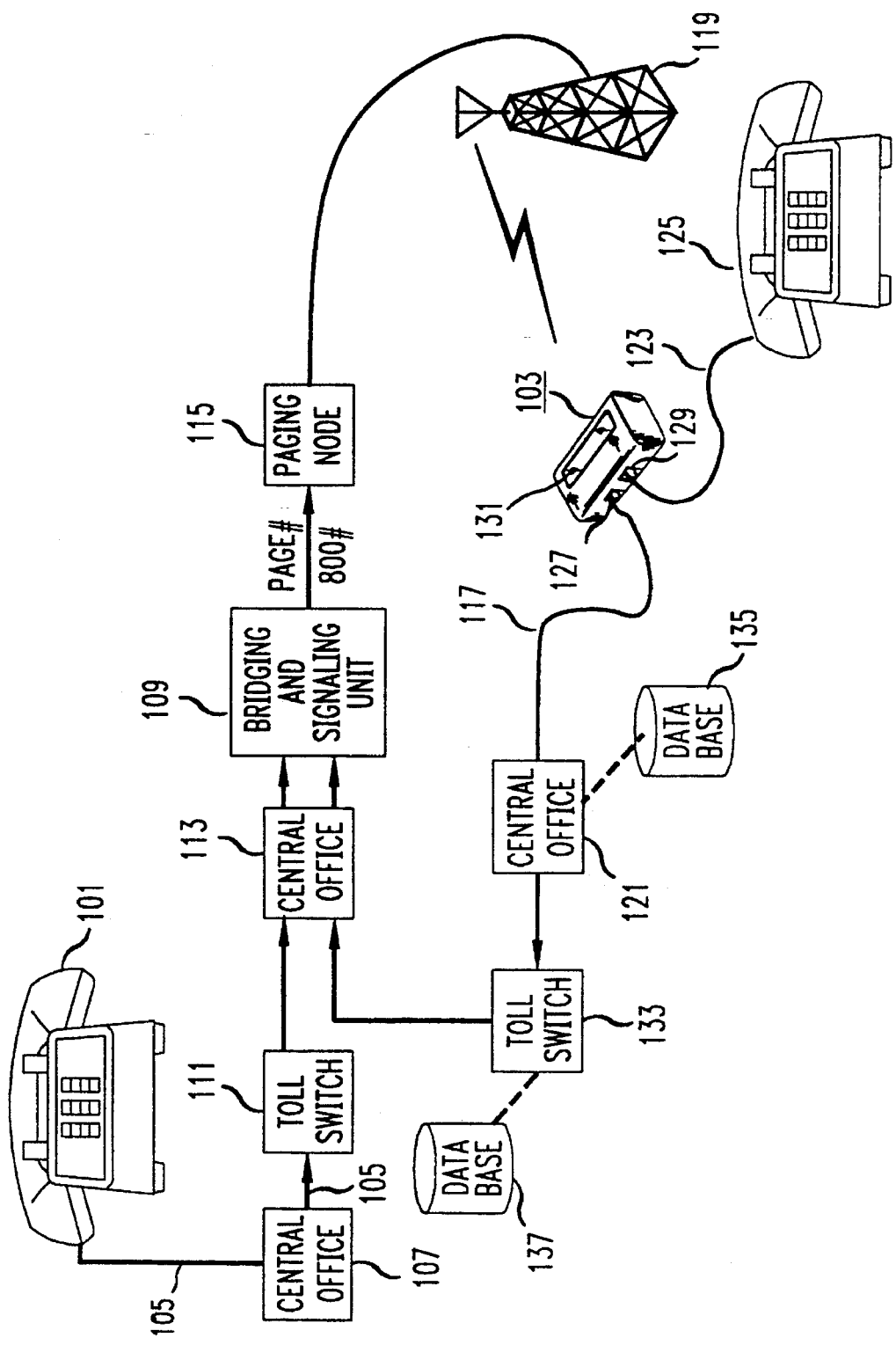
FIG. 1 shows an arrangement for providing transparent personal telecommunications services, in accordance with the principles of the invention.

FIG. 1 shows arrangement 100 for providing transparent personal telecommunications services, in accordance with the principles of the invention. A caller places a call from calling telephone 101 to the personal telephone number of an individual associated with personal communications unit 103. The caller's call passes over telephone line 105 to central office 107. Central office 107, in turn, routes the call to bridging and signaling unit 109, which is associated with the called number. Personal communications unit 103 is also associated with the called personal telephone number, as discussed further below.

Current United States telephone practices generally require that at least the one local exchange carrier (LEC, containing central office 107, mutes the caller's call. Also, the caller's call may be muted via an inter-exchange carrier, represented by toll switch 111, and another local exchange carrier, represented by central office 113. Central offices 107 and 113 may be the same office. If so, the call would not pass through any inter-exchange carrier or any other central offices.

Bridging and signaling unit 109 contains a so-called meet-me bridge for connecting at least two incoming calls to each other. Upon receipt of the caller's call, bridging and signaling unit 109 forwards paging information to paging node 115. The paging information includes a predetermined code that uniquely identifies the called individual's personal communications unit 103 and a telephone number to which a return call must be placed, in order to connect with or "meet" the caller. A copy of the predetermined code is stored within personal communications unit 103. Also, the telephone number for the return call is reserved, in advance, for use by bridging and signaling unit 109. Its selection is described further below. Paging node 115 causes a paging signal containing the paging information to be broadcast from paging tower 119. Paging system are well known in the art.

In accordance with an aspect of the invention, the telephone number of the return call is typically a toll-free, e.g., 800-type, of telephone number. One advantage of using an 800-type of telephone number is that the cost of the return call will not be charged to the subscriber of telephone line 117, who often will not be the called individual. No charge is incurred because 800-type telephone numbers are so-called "toll-free" telephone numbers. The owner of the "toll-free" telephone number, rather than the subscriber of the telephone line over which the call is made, incurs the charge for calls to such a number. Another advantage of using an 800-type of telephone number is that it allows personal communications allows unit 103 to place the return call without having any information about the area code of the telephone line to which it is connected. This is because calls to 800-type telephone numbers are unlike calls to conventional telephone numbers. Calls to conventional telephone numbers employ the area code for routing purposes. Such calls require the explicit dialing of the area code of the destination location for calls placed from one area code to another and that no area code be dialed for calls placed within a single area code. However, 800-type telephone numbers employ the 800 area code to indicate the toll-free nature of the call and that the telephone network should translate the telephone number to its corresponding destination location. As such, the 800 area code must always be dialed for such calls to give these indictions to the telephone network, even if the destination location is within the same area code as the location of the caller.

Telephone line 117 connects personal communications unit 103 to central office 121. Telephone mounting cord 123 connects personal communications unit 103 to telephone 125. Standard telephone RJ-11 jacks 127 and 129 respectively connect telephone line 117 and telephone mounting cord 123 to personal communications unit 103. Again, the individual associated with personal communications unit 103 need not be, and typically is not, the owner of telephone 125 or the subscriber of telephone line 117. Instead, it is expected that each owner of a personal communications unit 103 will take it with him in his travels and attach it, in the manner shown, at each of his destinations, so as to receive calls.

Personal communications unit 103 receives paging signals transmitted from paging tower 119. In the event that the code contained within the paging information of a paging signal matches the predetermined code stored in personal communications unit 103, personal communications unit 103 automatically places a telephone call, which is the return call, to the telephone number specified in that page, over a switched telephone network, in accordance with an aspect of the invention. As such, central office 121 receives the return call, from telephone line 117, and routes it to bridging and signaling unit 109. To this end, central office 121 may route the call via an inter-exchange carrier, represented by toll switch 133, and another local exchange carrier, represented by central office 113. The routing of return calls to 800-type telephone numbers follows well-known practices in the art for muting calls to 800-type telephone numbers. U.S. Pat. No. 4,191,860 issued to R. P. Weber on Mar. 4, 1980, describes one system for routing and translating 800-type numbers. The association of central office 121 with database 135 and toll switch 133 with database 137 aids in the muting process.

In accordance with the principles of the invention, personal communications unit 103 alerts the called individual to the existence of a call placed to his personal number only upon an indication that the call from calling telephone 101 remains in progress. To this end, upon receipt of the return call, bridging and signaling unit 109 continually determines if the call from telephone 101 remains in progress. As long as the call from telephone 101 remains in progress, bridging and signaling unit 109 sends a so-called "in-progress" signal, over the return call, to personal communications unit 103. Personal communications unit 103 begins to alert upon receipt of the in-progress signal. Furthermore, in accordance with an aspect of the invention, personal communications unit 103 continues to alert only during continued reception of the in-progress signal or until it detects telephone 125 having gone off-hook while personal communications unit 103 was still alerting. To complete the caller's call, in accordance with aspects of the invention, personal communications unit 103 connects telephone 125 to telephone line 117 if telephone 125 goes off-hook while personal communications unit 103 is alerting. At that time, bridging and signaling unit 109 connects the caller's call from telephone 101 to the return call. As a result of these connections, the caller at telephone 101 can converse with the called individual at telephone 125.

Figure 2:
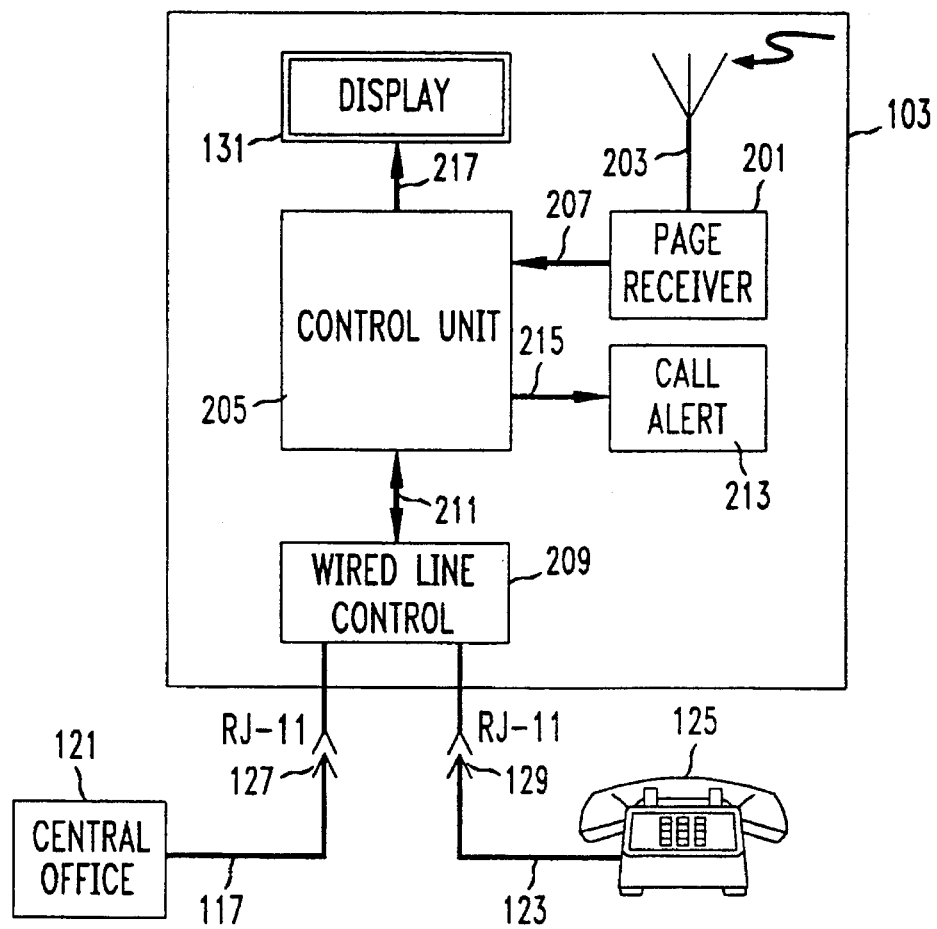
FIG. 2 shows, in block diagram form, a more detailed view of a personal communications unit shown in FIG. 1.

FIG. 2 shows, in block diagram form, a more detailed view of personal communications unit 103. Page receiver 201 receives paging signals transmitted from paging tower 119 via paging antenna 203. Page receiver 201 also stores the predetermined code associating an individual with personal communications unit 103. In response to the reception of a paging signal containing paging information having this code, page receiver 201 sends to control unit 205, over link 207, the telephone number to which personal communications unit 103 must place the return call. As noted, this telephone number is also part of the paging information. Upon receiving the telephone number for a return call, control unit 205 cooperates with wire line control 209 to place the return call to the received telephone number, if telephone line 117 is idle. To this end, control unit 205 and wire line control 209 communicate over bi-directional link 211.

In accordance with an aspect of the invention, if the return call is successfully placed and personal communications unit 103 receives an in-progress signal indicating that the callers telephone call continues to be in progress, control unit 205 signals call alert 213, over link 215, to begin generating an alerting indication. In one embodiment, the alerting indication is a predetermined beeping tone. Also, control unit 205 supplies to optional display 131, over link 217, the identity of the caller, if that information is available. Either a portion of the paging signal or signals supplied via telephone line 117 may provide the caller identity.

Figure 3:
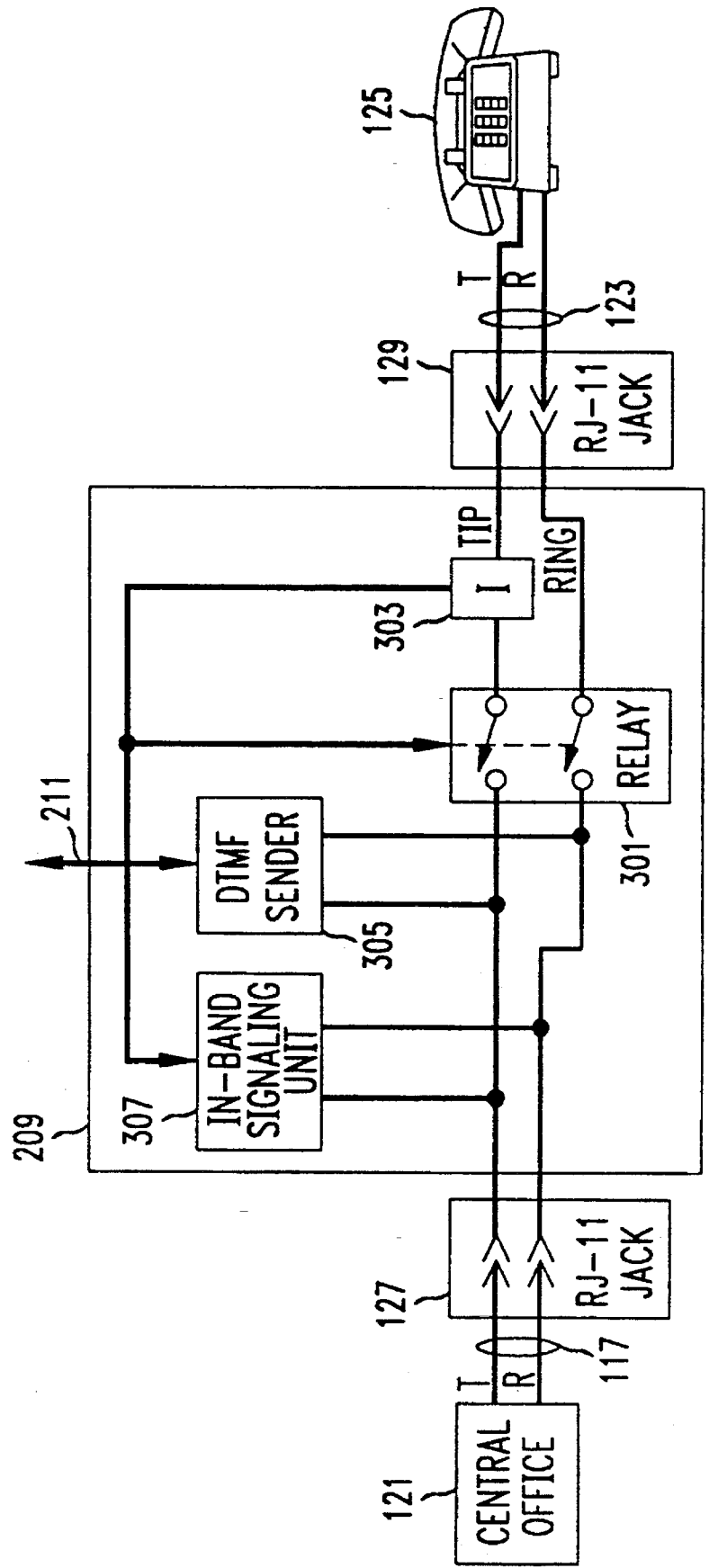
FIG. 3 shows an expanded view of a wired line control unit shown in FIG. 2.

FIG. 3 shows an expanded view of wired line control 209. The elements of wired line control 209 include: a) relay 301, b) current detector (I) 303, c) dual tone multi-frequency (DTMF) sender 305 and d) in-band signaling unit 307. All of the elements respond to commands from control unit 205. They receive such commands over link 211. Relay 301 isolates telephone 125 from line 117 while the automatic placing of a return call proceeds. Otherwise, the contacts of relay 301 remain closed. Current detector 303 determines if loop current is flowing from telephone line 117 to telephone 125. The flowing of loop current indicates that telephone 125 is either in an off-hook state or ringing. In either case, telephone 125 and telephone line 117 are busy and line 117 is unavailable for use in placing a return call. Current detector 303 transmits the results of its determination to control unit 205, via link 211. DTMF sender 305 can both take telephone line 117 off-hook and send DTMF tones over telephone line 117 to the central office. In-band signaling unit 307 receives signals from telephone line 117. It informs control unit 205 of the signals it receives over link 211. In-band signaling unit 307 can also send in-band signals over telephone line 117 to central office 121.

Figure 4:
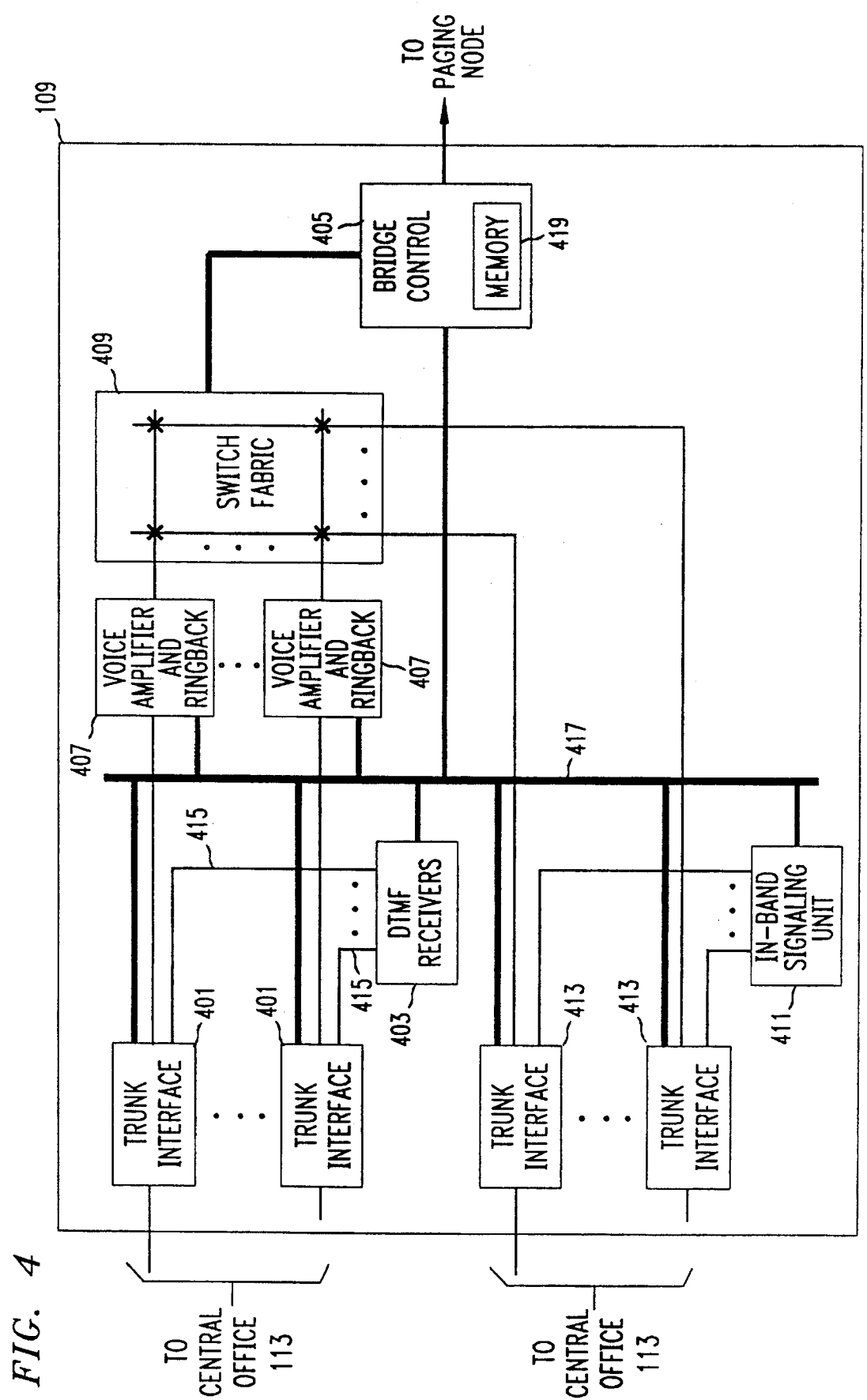
FIG. 4 shows, in block diagram form, an expanded view of the bridging and signaling unit shown in FIG. 1.

FIG. 4 shows, in block diagram form, an expanded view of bridging and signaling unit 109. Bridging and signaling unit 109 includes: a) trunk interfaces 401, b) DTMF receivers 403, c) bridge control 405, d) voice amplifier and ringback units 407, e) switch fabric 409, f) in-band signaling unit 411 and g) trunk interfaces 413. Bridge control 405 controls and coordinates the operation of bridging and signaling unit 109 by communicating commands and information over control bus 417.

Calls placed by callers to personal numbers of individuals associated with a personal communications unit 103 are received and terminated at bridging and signaling unit 109 by one of trunk interfaces 401. In one embodiment, the interface between central office 113 and trunk interfaces 401 is the same type of interface employed to connect a central office to a PBX equipped for direct inward dialing (DID). As pan of terminating a call, central office 113 sends the last four digits of the personal telephone number to bridging and signaling unit 109 over the trunk. These digits are sent as DTMF signals. One of DTMF receivers 403 receives the DTMF signals over one of lines 415 and decodes them. It informs bridge control 405 at which of trunk interfaces 401 the call arrived and the decoded four digits.

In response to the reception of the four decoded digits, bridge control 405 instructs one of voice amplifier and audible ring units 407 to supply ringback tone over the one of trunk interfaces 401 at which the call arrived. However, answer supervision is not supplied so that, advantageously, the caller is not charged for the call until it is answered by the called party. Bridge control 405 contains memory 419. Memory 419 maps the received four digits of the called individual's personal telephone number to the predetermined code stored in the personal communications unit 103 associated with the called individual. Bridge control 405 selects an idle one of trunk interfaces 413 at which to receive the return call. The trunks connecting central office 113 to trunk interfaces 413 are dedicated trunks and each has its own telephone number. Thereafter, bridge control 405 supplies to paging node 115 (FIG. 1) both the telephone number of the trunk associated with the selected idle one of trunk interfaces 413, as the number for the return call, and the predetermined code of the called individual.

Upon receipt of a return call at the selected one of trunk interfaces 413, bridge control 405 determines which of trunk interfaces 401 holds the call of the caller that corresponds to this return call. In accordance with an aspect of the invention, if the caller's call is still in progress; bridge control 405 causes in-band signaling unit 411 to transmit an in-progress signal to personal communications unit 103. If the called individual goes off-hook at telephone 125 (FIG. 1), in-band signaling unit 411 receives a signal from in-band signaling unit 307 (FIG. 3) indicating this. In response to this signal, bridge control 405 commands switch fabric 409 to interconnect the caller's call with its respective return call. Bridge control 405 also commands the respective one of voice amplifier and ringback units 407 to cease supplying ringback tone to the caller and to switch to amplification mode. This is necessary because a back-to-back connection of two separate telephone calls requires amplification to overcome the attendant loss of signal strength. Simultaneously, bridge control 405 commands trunk interface 401 to return the well-known answer supervision signal to the caller's call.

Figure 5:
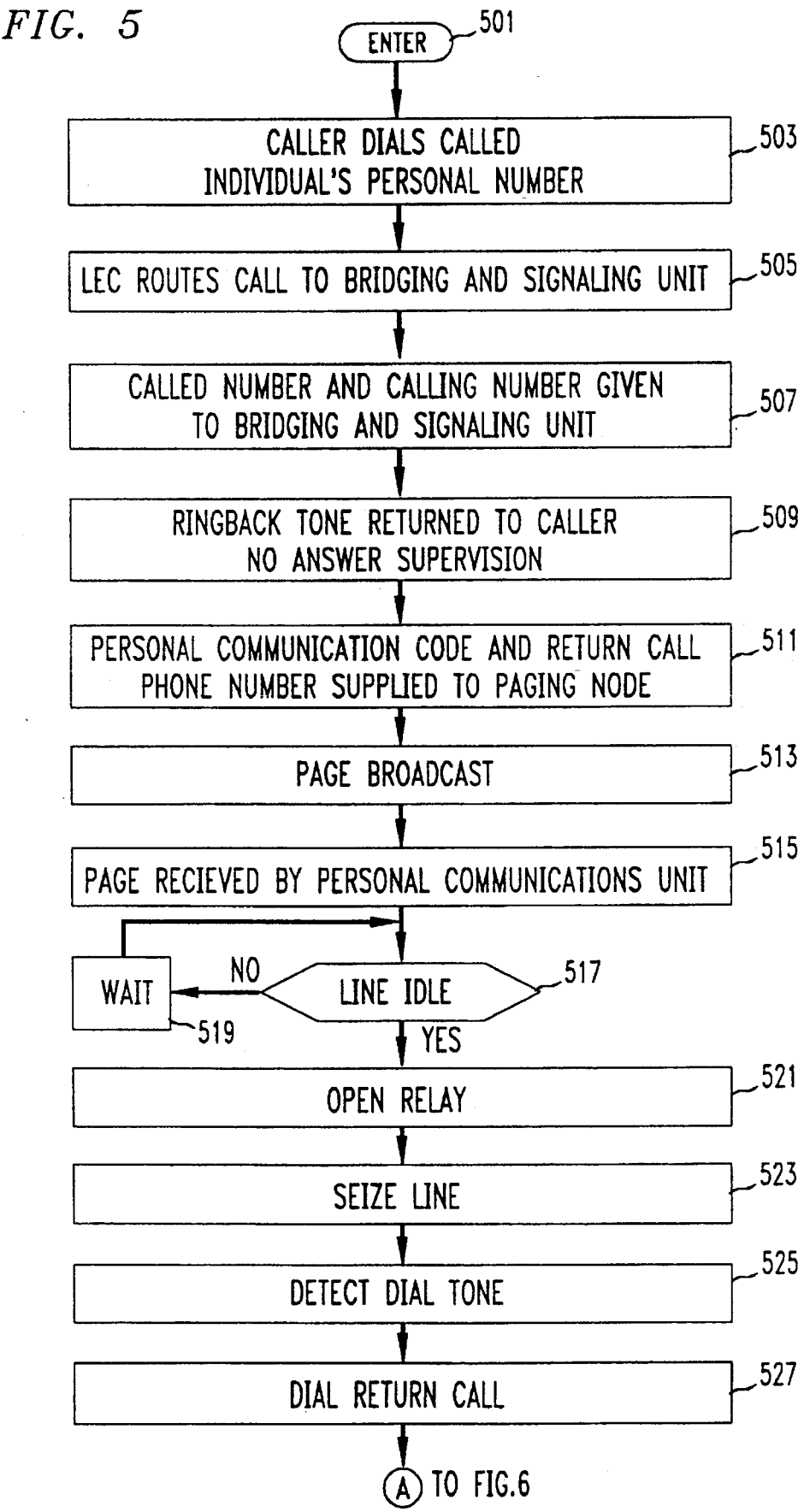
FIGS. 5 and 6, when connected together, show a flow chart of an exemplary process for completing a call placed to the personal number of an individual associated with the personal communications unit shown in FIG. 1.
Figure 6:
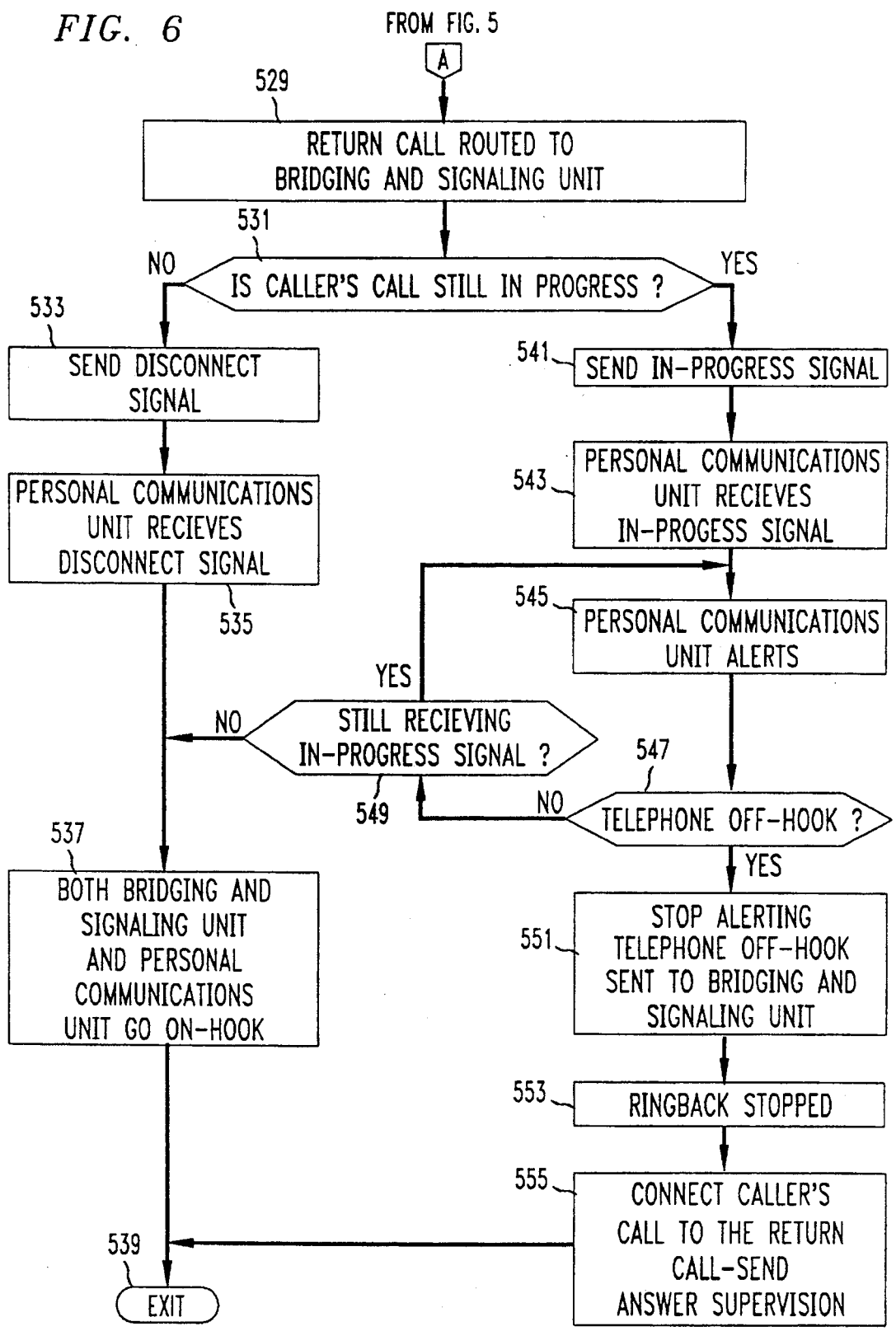

FIGS. 5 and 6, when connected together, show a flow chart of an exemplary process for completing a call placed to the personal number of a called individual associated with one of personal communications unit 103 (FIG. 1). The process begins in step 501 (FIG. 5) when a caller decides to make a call to the personal number of the individual associated with personal communications unit 103. To this end, in step 503, the caller dials the called individual's personal number at telephone 101 (FIG. 1). A local exchange carrier (LEC) routes the call to bridging and signaling unit 109 in step 505. Thereafter, in step 507, the LEC supplies the called number and, if available, the calling number to bridging and signaling unit 109.

In step 509, bridging and signaling unit 109 supplies ringback tone to telephone 101. However, answer supervision is not supplied. Bridging and signaling unit 109 sends to paging node 115 the paging information, i.e., the predetermined code of the called individual that is stored within personal communications unit 103 and the telephone number to which the return call must be made, in step 511. In step 513, paging tower 119 broadcasts a paging signal that includes the paging information.

Personal communications unit 103 receives the paging signal in step 515 without alerting the user. Next, in conditional branch point 517, current detector 303 (FIG. 3) tests to determine if telephone line 117 is idle. If the test result in step 517 is NO, control passes to step 519, which waits for a predetermined mount of time. Control then passes back to step 517, to retest the idle status of telephone line 117. As will be readily apparent to those skilled in the art, the total length of time waited for telephone line 117 to become idle may be limited to a predetermined period of time.

If the test result in step 517 is YES, control passes to step 521, in which relay 301 (FIG. 3) opens, causing the disconnection of telephone 125 (FIG. 1) from telephone line 117. In step 523, DTMF sender 305 (FIG. 3) seizes telephone line 117 by supplying an off-hook indication to central office 121. In step 525, in-band signaling unit 307 (FIG. 3) detects the presence of dial tone supplied by central office 121 (FIG. 1). Next, in step 527, DTMF sender 305 dials the number for the return call, e.g., an 800-type telephone number, received as pan of the paging information. Central office 121 routes the return call to bridging and signaling unit 109, in step 529. Thereafter, bridging and signaling unit 109 tests to determine, in conditional branch point 531, if the caller's call remains in progress. If the test result in step 531 is NO, bridging and signaling unit 109 sends a disconnect signal to personal communications unit 103. In step 535, personal communications unit 103 receives the disconnect signal. Both bridging and signaling unit 109 and personal communications unit 125 go on-hook, in step 537. Thereafter, the process is exited in step 539.

If the test result in step 531 is YES, control passes to step 541, in which bridging and signaling unit 109 sends an in-progress signal from in-band signaling unit 411, in accordance with an aspect of the invention. In step 543, personal communications unit 103 receives the in-progress signal. In accordance with an aspect of the invention, personal communications unit 103 begins alerting, in step 545, in response to reception of the in-progress signal. Control next passes to conditional branch point 547, which tests to determine if telephone 125 (FIG. 1) has gone off-hook. If the test result in step 547 is NO, control passes to conditional branch point 549, which tests to determine if personal communications unit 103 continues to receive the in-progress signal. If the test result in step 549 is NO, control passes to step 537, and the process continues as described above. If the test result in step 549 is YES, control passes back to step 545 and personal communications unit 103 continues to alert.

If the test result in step 547 is YES, control passes to step 551, in which personal communications unit 103 sends to bridging and signaling unit 109 an in-band signal indicating that telephone 125 has gone off-hook. Also, alerting by personal communications unit 103 ceases. In response to the signal indicating that telephone 125 has gone off-hook, bridging and signaling unit 109 stops sending ringback tone to telephone 101, in step 553. Next, in step 555, switch fabric 409 (FIG. 4) interconnects the caller's call and the return call at bridging and signaling unit 109. This allows the caller to talk with the called individual. Bridging and signaling unit 109 also causes answer supervision to be supplied over the one of trunk interfaces 401 (FIG. 4) at which the caller's call is terminated. Advantageously, this allows charging of the caller only for the time that he has a connection for use in conversing with the called individual. The process is then exited in step 539.

At the end of the conversation, either the caller or the called individual will go on-hook. At that time, the call between the on-hook party and bridging and signaling unit 109 is taken down. Furthermore, bridging and signaling unit 109 causes the call by the party not going on-hook to be taken down as well.

Figure 7:
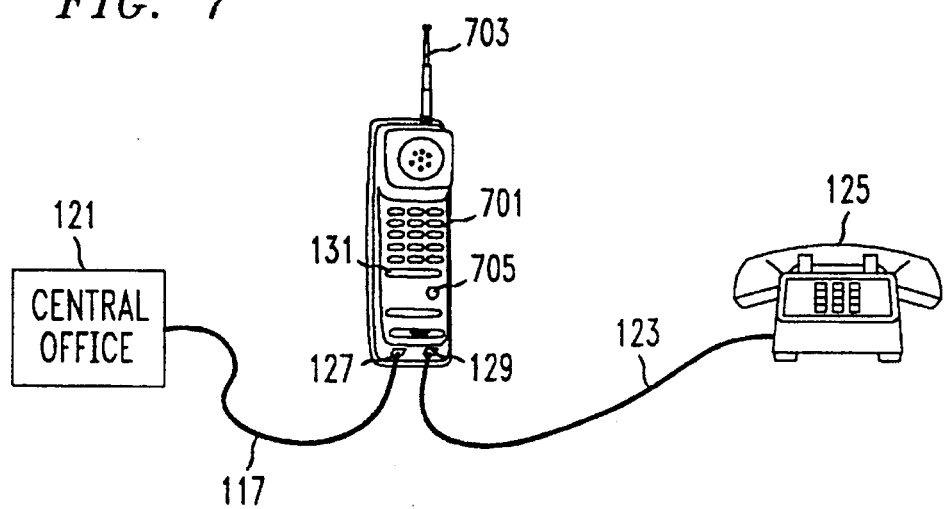
FIG. 7 shows another embodiment of the invention in which a personal communications unit is combined with a mobile telephone to form a portable personal communications unit.

FIG. 7 shows another embodiment of the invention in which portable personal communications unit 701 is formed by combining personal communications unit 103 with a mobile telephone. When hooked-up to a wired telephone line and a wired telephone, in the manner shown, operation of portable personal communications unit 701 is the same as operation of personal communications unit 103. An additional feature of portable personal communications unit 701 is that if telephone line 117 is in use, and, therefore, unavailable for the placing of a return call, the return call is placed by the mobile telephone portion of portable personal communications 701 using mobile telephone service. Also, whenever portable personal communications unit 701 is not connected to a telephone line, it places the return call using mobile telephone service.

Figure 8:
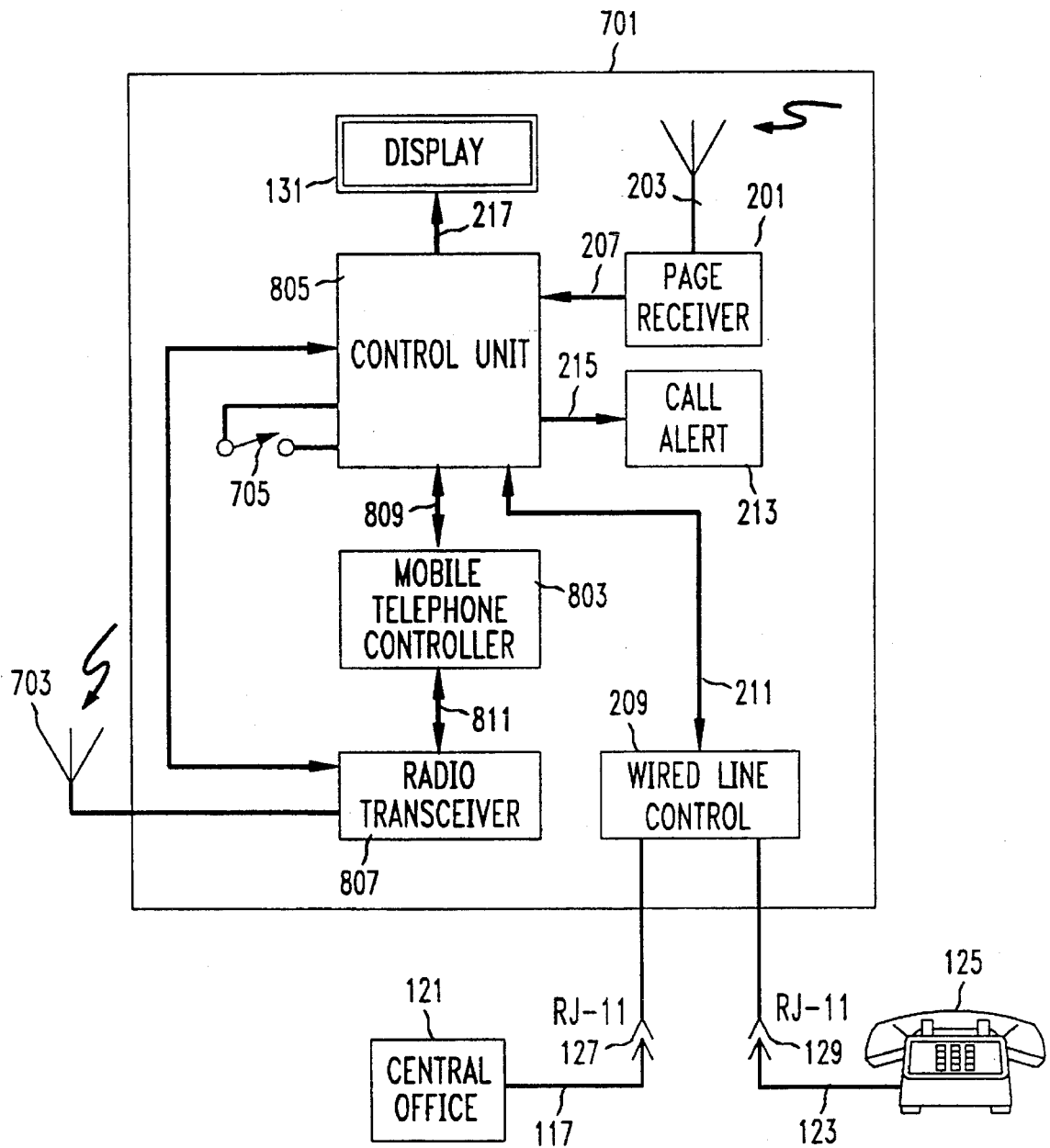
FIG. 8 shows, in simplified block diagram form, an expanded version of the portable personal communications unit shown in FIG. 7.

Shown in FIG. 8, in simplified block diagram form, is an expanded version of portable personal communications unit 701. Page receiver 201, antenna 203, link 207, wire line control 209, link 211, call alert 213, link 215, link 217 and display 131 are the same as described above for personal communications unit 103, as shown in FIG. 2. Mobile telephone controller 803 controls the mobile telephone functions of portable personal communications unit 701. To this end, link 811 connects mobile telephone controller 803 to radio transceiver 807. Also, link 809 connects mobile telephone controller 803 to control unit 205. Control unit 805 is an enhanced version of control unit 205 (FIG. 2). These enhancements include an interface with mobile telephone controller 803 that permits the placing of telephone calls using the mobile telephone service, in addition to the wired line capability. Implementation of such enhancements will be readily apparent to those skilled in the art.

In accordance with an aspect of the invention, should telephone line 117 become available after the placing of a return call over a mobile telephone channel, the mobile telephone call may be transferred to telephone line 117. To this end, the called individual presses optional reset button 705 on portable personal communications unit 701. As a result, portable personal communications unit 701 goes on-hook on the mobile telephone channel it was using. Immediately thereafter, portable personal communications unit 701 goes off-hook on telephone line 117 and redials the telephone number from the last received paging information. In this embodiment, bridging and signaling unit 109 holds the caller's call after detecting the end of a return call for a length of time sufficient for a return call over a wired telephone line to be completed before it begins disconnecting the caller. As such, it results in restarting the process shown in FIG. 5 at step 529. Therefore, the second return call over the wired telephone line, made in response to the pressing of reset button 705, will complete a connection to the caller as described above. Implementing the reverse transfer, from a wired telephone to mobile telephone service will be readily apparent to those skilled in the art.

If personal communications unit 103 is placed "behind" a PBX, it may be necessary, as will be well understood by those skilled in the art, for personal communications unit 103 to dial a prefix code, e.g., 9, to reach an outside line prior to dialing the telephone number of the return call. In such a case, personal communications unit 103 must obtain and store the necessary prefix code prior to completing any calls. In one embodiment, the process of obtaining the prefix code by personal communications unit 103 employs a training procedure. For example, if personal communications unit 103 detects the reception of a predetermined code from telephone 125 when it is off-hook, e.g., **#, any digits received thereafter, until telephone 125 goes on-hook again, are used as the prefix code. Other procedures and techniques for training personal communications unit 103 will be readily apparent to those skilled in the art.

Another application of the invention is the automatic set-up of a conference call. A caller at telephone 101 starts the set-up procedure by placing a call to the number of a conference service. This call is routed, as described above, to bridging and signaling unit 109, which causes multiple paging signals to be broadcast. Each paging signal includes a respective one of the predetermined codes stored in the personal communications unit 103 of the individuals to be included in the conference. Also, each of the paging signals contains a telephone number for a return call. As each of the personal communications units that received a paging signal for the conference makes its return call, bridging and signaling unit 109 conferences the respective return calls together with the caller's call from telephone 101 at switch fabric 409 (FIG. 4).

In another embodiment of the invention, bridging and signaling unit 109 always supplies, to paging node 115, the same 800-type telephone number for every return call rather than the particular number of the one of the trunks terminated by trunk interfaces 413. Central office 121, toll switch 133 and central office 113 route return calls placed to this number to available ones of trunk interfaces 413. Upon completing the return call to the supplied number, personal communications unit 103 supplies, via in-band signaling unit 307 (FIG. 3), its predetermined code from page receiver 201 (FIG. 2). Bridging and signaling unit 109 receives this code via in-band signaling unit 111 and supplies the code to bridge control 405 (FIG. 4). Bridge control 405, employing memory 419, maps the received code to the one of trunk interfaces 401 holding the caller's call. If the caller's call is still in progress, in-band signaling unit 411 transmits the in-progress signal. Thereafter, the operation proceeds as described above.

In another embodiment of the invention, trunk interfaces 401 and 413 terminate all digital transmission facilities, e.g., T-1 or ISDN primary rate interfaces (PRI). However, the functionality of trunk interfaces 401 and 413, that of receiving, holding, and identifying telephone calls, remains the same. The design of such trunk interfaces is well known in the art. Also, such embodiments of the invention can include the processing of both in-band and out-of-band signals. To this end, in-band signaling units 307 (FIG. 3) and 411 are replaced by in-band or in and out-of-band signaling units. The design of such signaling units will be readily apparent to those skilled in the art.

One advantage of the embodiment of the invention in which call alert 213 (FIG. 2) generates a beeping tone is that a personal telephone call using personal communications unit 103 (FIG. 1) does not activate an answering machine bridged with telephone 125. This is typically useful for situations in which either the owner of telephone 125 or the subscriber of telephone line 117 is different from the individual associated with personal communications unit 103. In such a situation, the person associated with personal communications unit 103 may never receive messages left on an answering machine bridged with telephone 125.

In another embodiment of the invention, call alert 213 could supply a ringing signal to telephone 125. Advantageously, such an arrangement makes the called individual's perception of such a telephone call the same as his perception of a typical direct dial telephone call. Also, this could allow for the activation of an answering machine bridged with telephone 125. In accordance with an aspect of the invention, the ringing signal supplied may cause the ringing cadence sounded by telephone 125, to be distinct from the cadence generated in response to any other type of telephone call telephone 125 receives. In accordance with another aspect of the invention, if telephone line 117 is in use upon reception of a paging signal, personal communications unit 103 can alert With a further distinctive pattern to indicate a call has been placed to the personal telephone number. This serves a purpose similar to that of the call waiting signal used in current telephone systems.

As noted above, display 131 can display the number of the caller if personal communications unit 103 receives the necessary information. The paging information may contain the caller's number. Alternatively, bridging and signaling unit 109 may supply the caller's number as part of the in-band signals it supplies from in-band signaling unit 411 (FIG. 4). In another embodiment of the invention, in-band signaling unit 307 (FIG. 3), of personal communications unit 103, receives and recognizes the well known incoming call line identification (ICLID) signals. Central offices supply ICLID signals for the service commonly known by the trade name of CALLER ID. In accordance with a feature of the invention, detection of the ICLID signals and displaying of the corresponding number on display 131 occurs regardless of whether their generation resulted from a regular telephone call placed to telephone 125 or a return call placed in response to a paging signal.

In a further embodiment of the invention, control unit 805 turns on power to the mobile telephone portion of portable personal communications unit 701 only in response to the reception of paging information by a page receiver 201. Until portable personal communications unit 701 receives paging information, it remains unpowered. An advantage of this embodiment is that the mobile telephone does not consume power listening to its control channel when calls are not actually in progress. This tends to increase the period of time between recharging cycles.

The foregoing merely illustrates the principles of the inventions. It will thus be appreciated that those skilled in the an will be able to devise various arrangements which, although not explicitly described or shown herein, embody the principles of the invention and are thus within its spirit and scope.

What is claimed is:

1. A method for use in completing a telephone call that is initiated from a calling telephone to a called individual comprising the steps of:

receiving a call placed to a telephone number of said called individual from said calling telephone;

sending a signal for actuating a personal communications unit of said called individual without alerting the called individual;

receiving a call to a predetermined number placed automatically by said personal communications unit in response to said signal for actuating;

checking if said telephone call from said calling telephone continues to be in progress;

transmitting a signal indicating the said telephone call from said calling telephone continues to be in progress if the result of said step of checking is affirmative; and then alerting the called individual for the first time, that the called individual is being called, so long as said telephone call from said calling telephone continues to be in progress.

2. The invention as defined in claim 1 including the further step of connecting said call from said calling telephone with said call placed by said personal communications unit.

3. The invention as defined in claim 2 including the further step of supplying answer supervision for said calling telephone substantially concurrently with said connecting step.

4. The invention as defined in claim 1 including the further steps of receiving a code that identifies said personal communications unit and said code determining whether said telephone call from said calling telephone is to be connected to said call placed automatically by said personal communications unit, and connecting the call from the calling telephone to the call placed by the personal communications unit when said telephone call from the calling telephone is to be connected to said call placed automatically by the personal communication unit.

5. The invention as defined in claim 1 including the step of supplying ringback signal to said calling telephone upon receipt of said call placed by said personal communications unit.

6. The invention as defined in claim 1 wherein said signal for actuating is a paging signal.

7. The invention as defined in claim 1 including the further step of sending over said call from said personal communications unit the telephone number of said calling telephone.

8. The invention as defined in claim 1 including the further steps of:

holding said call from said calling telephone for a predetermined period of time after said call from said personal communications unit has been disconnected; and repeating said steps of receiving from said personal communications unit, checking and sending.

* * * * *